(12) United States Patent
Han et al.

(10) Patent No.: US 11,940,592 B2
(45) Date of Patent: Mar. 26, 2024

(54) HYBRID PROCEDURE FOR EVALUATING STRESS MAGNITUDE AND DISTRIBUTION ON A LINER

(71) Applicant: ARAMCO SERVICES COMPANY, Houston, TX (US)

(72) Inventors: Yanhui Han, Houston, TX (US); Dung Phan, Brookshire, TX (US); Khalid AlRuwaili, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 522 days.

(21) Appl. No.: 17/150,142

(22) Filed: Jan. 15, 2021

(65) Prior Publication Data

US 2022/0229950 A1 Jul. 21, 2022

(51) Int. Cl.
*G01V 99/00* (2009.01)
*E21B 47/005* (2012.01)
(Continued)

(52) U.S. Cl.
CPC .......... *G01V 99/005* (2013.01); *E21B 47/005* (2020.05); *E21B 47/007* (2020.05); *E21B 49/00* (2013.01); *E21B 2200/20* (2020.05)

(58) Field of Classification Search
CPC ... G01V 99/005; E21B 47/007; E21B 47/005; E21B 49/00; E21B 2200/20
(Continued)

(56) References Cited

U.S. PATENT DOCUMENTS

| | | | |
|---|---|---|---|
| 2002/0059048 A1* | 5/2002 | Hardy | E21B 49/006 703/10 |
| 2009/0205819 A1 | 8/2009 | Dale et al. | |

(Continued)

FOREIGN PATENT DOCUMENTS

| | | |
|---|---|---|
| CN | 105740583 A | 7/2016 |
| CN | 106855897 A | 6/2017 |

(Continued)

OTHER PUBLICATIONS

Ichikawa, Yoshikazu, and George L. England. "Prediction of moisture migration and pore pressure build-up in concrete at high temperatures." Nuclear Engineering and design 228.1-3 (2004). pp. 245-259. (Year: 2004).*

(Continued)

*Primary Examiner* — John E Johansen
(74) *Attorney, Agent, or Firm* — Osha Bergman Watanabe & Burton LLP

(57) ABSTRACT

A method for evaluating an integrity of a liner disposed in a wellbore, that contacts a formation through a cement layer between the liner and the formation, includes computing a stress on a boundary of the liner by an iteration procedure that implements an analytical solution of stresses on a liner-cement interface and a cement-formation interface using the geometric data, performing numerical simulations using the computational numerical model to calculate a magnitude and distribution of stresses acting on the liner-cement interface and the cement-formation interface, performing numerical simulations with the actual in-situ stresses to replace the mean in-situ stress on the outer boundary of formation layer to calculate magnitude and distribution of stresses acting on the liner-cement and cement-formation interfaces using the calibrated computational mesh and applying the calculated stresses acting on (Continued)

the liner to a liner integrity evaluation model to determine an integrity of the liner at a plurality of stages of the wellbore.

19 Claims, 11 Drawing Sheets

(51) Int. Cl.
*E21B 47/007* (2012.01)
*E21B 49/00* (2006.01)

(58) Field of Classification Search
USPC .......................................................... 703/10
See application file for complete search history.

(56) References Cited

U.S. PATENT DOCUMENTS

2018/0293789 A1    10/2018  Shen et al.
2021/0406426 A1*   12/2021  Han .................... G06F 30/10

FOREIGN PATENT DOCUMENTS

| | | |
|---|---|---|
| CN | 109322661 A | 2/2019 |
| CN | 109931048 A | 6/2019 |
| IN | 109033504 A | 12/2018 |
| WO | 2012082143 A1 | 6/2012 |
| WO | 2016182798 A1 | 11/2016 |
| WO | 2019005053 A1 | 1/2019 |
| WO | 2019119107 A1 | 6/2019 |
| WO | 2021263031 A1 | 12/2021 |

OTHER PUBLICATIONS

Teodoriu, Catalin, Ignatius Ugwu, and Jerome Schubert. "Estimation of casing-cement-formation interaction using a new analytical model." SPE Europec featured at EAGE Conference and Exhibition?. SPE, 2010. pp. 1-13. (Year: 2010).*
Welch, N. J., L. P. Frash, and J. W. Carey. "Effective cement stress in well completions: An important unknown." ARMA US Rock Mechanics/Geomechanics Symposium. ARMA, 2019. pp. 1-6. (Year: 2019).*
Patel, Harshkumar, and Saeed Salehi. "Development of an advanced finite element model and parametric study to evaluate cement sheath barrier." Journal of Energy Resources Technology 141.9 (2019). pp. 092902-1-092902-8. (Year: 2019).*
Gholami, Raoof et al., "A thermo-poroelastic analytical approach to evaluate cement sheath integrity in deep vertical wells", Journal of Petroleum Science and Engineering, ScienceDirect, Elsevier B.V., vol. 147, Sep. 2016, pp. 536-546 (11 pages).
Zhang, Hong et al., "Cement sheath integrity analysis of underground gas storage well based on elastoplastic theory", Journal of Petroleum Science and Engineering, ScienceDirect, Elsevier B.V., vol. 159, Oct. 2017, pp. 818-829 (12 pages).
Arjomand, Elaheh et al., "Evaluation of cement sheath integrity subject to enhanced pressure", Journal of Petroleum Science and Engineering, ScienceDirect, Elsevier B.V., vol. 170, Jun. 2018, pp. 1-13 (13 pages).
Teodoriu, Catalin et al., "Estimation of Casing-Cement-Formation Interaction using a new Analytical Model", SPE 131335, Society of Petroleum Engineers, Jun. 2010, pp. 1-13 (13 pages).
Zhifei, Shi et al., "Exact solutions of heterogeneous elastic hollow cylinders", Composite Structures, Elsevier Ltd., vol. 79, 2007, pp. 140-147 (8 pages).
"FLAC Version 7.0", Itasca Consulting Group, 2011 (6 pages).
International Search Report issued in corresponding International Application No. PCT/US2022/012480; dated Jul. 4, 2022 (3 pages).
Written Opinion of the International Searching Authority issued in corresponding International Application No. PCT/US2022/012480; dated Jul. 4, 2022 (6 pages).

* cited by examiner (a) A concentric multi-layer elastic medium subjected to uniform loads inside and outsider (b) Flow chart of analytical solutions

HYBRID PROCEDURE FOR EVALUATING STRESS MAGNITUDE AND DISTRIBUTION ON A LINER

BACKGROUND

Any string of casing in which the top does not extend to the surface but instead is suspended from inside the previous casing string is referred to as a liner in the oil and gas industry. Many conventional well designs include a production liner set across the reservoir interval. Liner disintegration and/or deformation may fail a well simulation, workover and production. Maintaining a liner integrity, under various life stages of a well, is of a critical importance. The integrity of a liner is determined by stress magnitude and distribution around an outer boundary of the liner, fluid pressure inside the liner and geometric and mechanical properties of the liner. The critical factors for the integrity of the liner are the magnitude and distribution of loads on the inside and outside boundaries of the liner, and the loading capacity of the liner under different deformation modes, decided by the mechanical and geometric properties of the liner.

A liner is typically connected with a geological formation or rock mass of a wellbore through a cementing layer. Accordingly, the magnitude and distribution of the load on the liner's outer boundary are determined by the thickness and mechanical properties of the cement layer, the mechanical properties of the geological layer, and the in-situ stresses and pore pressure.

SUMMARY

In general, in one aspect, embodiments disclosed herein relate to a method for evaluating an integrity of a liner disposed in a wellbore that contacts a formation through a cement layer between the liner and the formation. A method includes obtaining geometric data and at least one property of the liner, determining in-situ stress and pore pressure on the formation, computing a stress on a boundary of the liner by an iteration procedure that implements an analytical solution of stresses on a liner-cement interface and a cement-formation interface using the geometric data, the at least one property, the mean in-situ stress and the wellbore pressure, constructing a computational numerical model for simulating interactions between the liner, the cement layer and the formation, performing numerical simulations using the computational numerical model to calculate a magnitude and distribution of stresses acting on the liner-cement interface and the cement-formation interface, wherein the numerical simulations are repeatedly performed to obtain model-predicted stresses, comparing the model-predicted stresses on the liner-cement and cement-formation interfaces with values provided by the analytical solution until the model-predicted stresses substantially match the analytical solution, performing numerical simulations with the actual in-situ stresses to replace the mean in-situ stress on the outer boundary of formation layer to calculate magnitude and distribution of stresses acting on the liner-cement and cement-formation interfaces using the calibrated computational mesh above where analytical solutions and numerical simulation results match, and applying the calculated stresses acting on the liner to a liner integrity evaluation model to determine an integrity of the liner at a plurality of stages of the wellbore.

In general, in one aspect, embodiments disclosed herein relate to a liner suspended in a wellbore. The liner includes at least one mechanical property and an outer boundary, wherein the liner is part of a three-layer hollow cylindrical system comprising: a geological formation, the liner, and a cement layer, the liner contacting the geological formation through the cement layer, wherein a liner-cement interface exists between the liner and the cement layer, and a cement-formation interface exists between the cement layer and the geological formation, and wherein an integrity of the liner is evaluated by: computing a stress on the outer boundary of the liner by an iteration procedure that implements an analytical solution of stresses on the liner-cement interface and the cement-formation interface, constructing a computational numerical model for simulating interactions between the liner, the cement layer and the formation, performing numerical simulations using the computational numerical model to calculate a magnitude and distribution of stresses acting on the liner-cement interface and the cement-formation interface, wherein the numerical simulations are repeatedly performed to obtain model-predicted stresses, comparing the model-predicted stresses on the liner-cement and cement-formation interfaces with values provided by the analytical solution until the model-predicted stresses substantially match the analytical solution, performing numerical simulations with the actual in-situ stresses to replace the mean in-situ stress on the outer boundary of formation layer to calculate magnitude and distribution of stresses acting on the liner-cement and cement-formation interfaces using the calibrated computational mesh above where analytical solutions and numerical simulation results match, and applying the calculated stresses acting on the liner to a liner integrity evaluation model to determine the integrity of the liner at a plurality of stages of the wellbore.

In general, in one aspect, embodiments disclosed herein relate to a non-transitory computer readable comprising program instructions, that when executed, are configured to perform a method for evaluating the integrity of a liner. The instructions, when executed, are obtaining geometric data and at least one property of the liner, determining in-situ stress and wellbore pressure on the formation, computing a stress on a boundary of the liner by an iteration procedure that implements an analytical solution of stresses on a liner-cement interface and a cement-formation interface using the geometric data, the at least one property, the in-situ stress and the wellbore pressure, constructing a computational numerical model for simulating interactions between the liner, the cement layer and the formation, performing numerical simulations using the computational numerical model to calculate a magnitude and distribution of stresses acting on the liner-cement interface and the cement-formation interface, wherein the numerical simulations are repeatedly performed to obtain model-predicted stresses, comparing the model-predicted stresses on the liner-cement and cement-formation interfaces with values provided by the analytical solution until the model-predicted stresses substantially match the analytical solution, performing numerical simulations with the actual in-situ stresses to replace the mean in-situ stress on the outer boundary of formation layer to calculate magnitude and distribution of stresses acting on the liner-cement and cement-formation interfaces using the calibrated computational mesh above where analytical solutions and numerical simulation results match, and applying the calculated stresses acting on the liner to a liner integrity evaluation model to determine an integrity of the liner at a plurality of stages of the wellbore.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
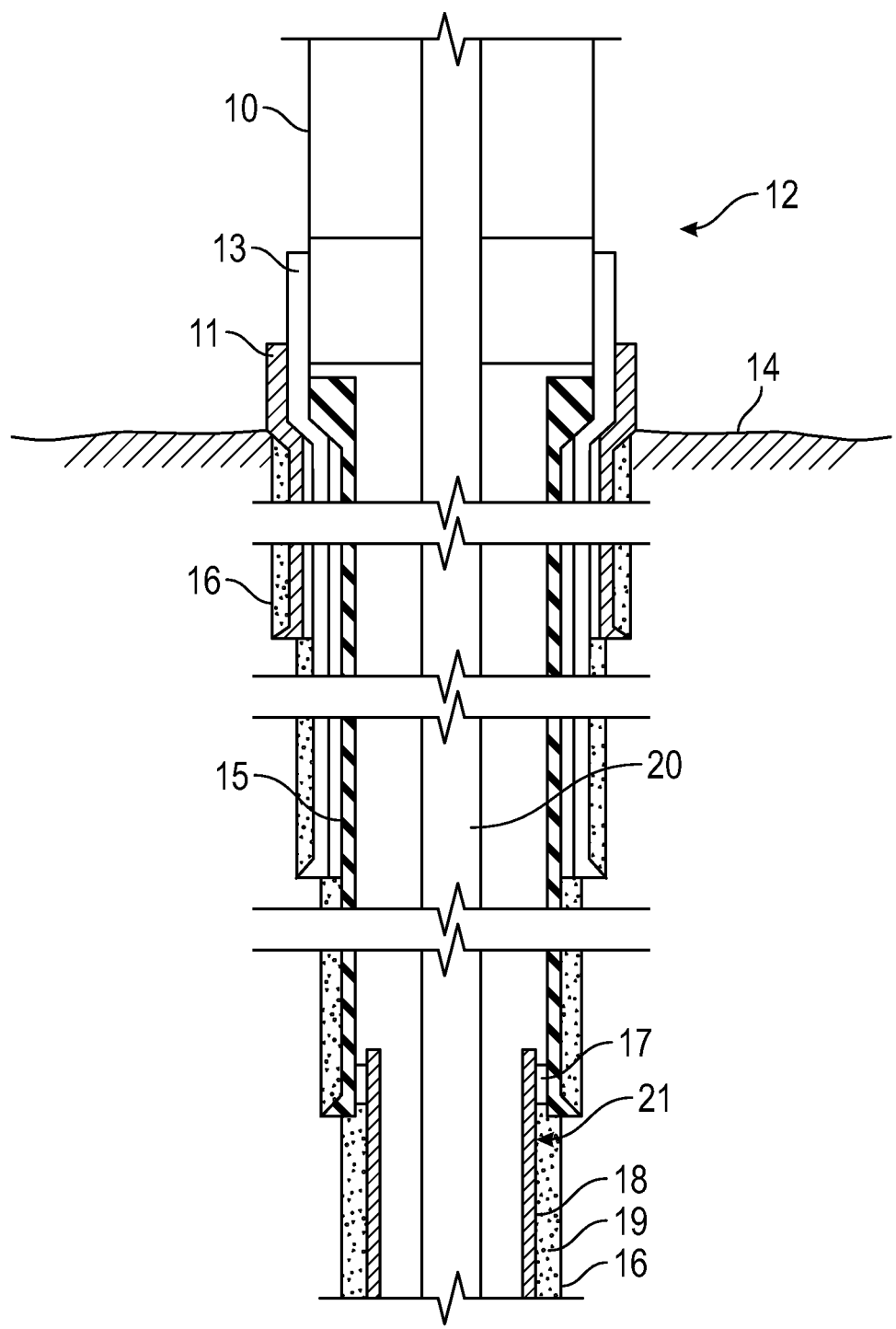
FIG. 1 shows a cross-sectional view of a well having casing hung from the wellhead and a liner hung from the casing in accordance with one or more embodiments disclosed herein.

In the following detailed description of embodiments disclosed herein, numerous specific details are set forth in order to provide a more thorough understanding disclosed herein. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-5, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that, one or more of the steps shown in the flowcharts may be omitted, repeated, and/or performed in a different order than the order shown. Accordingly, the scope disclosed herein should not be considered limited to the specific arrangement of steps shown in the flowcharts.

In general, embodiments of the invention are directed toward a hybrid procedure for evaluating stress magnitude and distribution on a liner in a wellbore. More specifically, embodiments disclosed herein discuss a novel procedure to evaluate the integrity of a liner in an unequal stress field. In one or more embodiments, the procedure is a hybrid method in that it combines and integrates a closed-form solution and a numerical modeling methodology. The closed-form solution computes an ideal stress magnitude on the outer boundary of the liner under loading of mean stress, which may be deemed as a "ballpark" solution. The numerical modeling solves the stress distribution on the liner in the three-layer (i.e., liner-cement-formation), two-dimensional hollow cylinder problem subjected to an unequal stress loading condition and additional changes due to engineering operations. The accuracy of the numerical modeling prediction is ensured through integration with analytical solution. In other words, the extension and resolution of the computational mesh used in the numerical modeling are calibrated and verified by the closed-form solution.

FIG. 1 shows an example of a well having a riser (10) extending to a wellhead assembly (12) at the floor (14). The wellhead assembly (12) includes an outer wellhead housing (11) and an inner wellhead housing (13). Casing strings (15) are hung from the wellhead assembly (12) and cemented around the borehole wall (16). A liner (18) is secured to the lowermost end of the casing (15) with a liner hanger (17) and extends a depth into the borehole from the end of the casing (15). The annulus between the borehole wall (16) and the liner (18) may be filled with cement (19) to cement the liner (18) in place. Drill string (20) may run through the casing (15) and liner (18) to continue downhole operations.

In one or more embodiments, the liner (18) has geometric data associated with it, such as an inner and an outer diameter of the liner. The liner (18) may also be associated with certain mechanical properties such as a mechanical strength of the liner. The liner (18) may experience stress acting on its outer boundary (21). The stress acting on the outer boundary (21) of the liner (18) may be due to the weight of the overlaying materials or any disturbance of the surrounding formation. This stress may cause damage to the integrity of the liner and hence to the entire well.

During drilling operations, as the bottom hole assembly (including drill bit) drills farther into the earth, additional sections of drill pipe, often referred to as drill pipe stands, are added to the top of the drill string at the rig surface. To add additional stands of drill pipe, rotation of the drill string is stopped while the new drill pipe section is connected. In many operations, continuous circulation systems may be used to continue circulation of drilling fluid through the drill string while the drill string is stationary and new drill pipe is being connected in order to prevent the settling of drill cuttings and prevent equipment stick.

Figure 2:
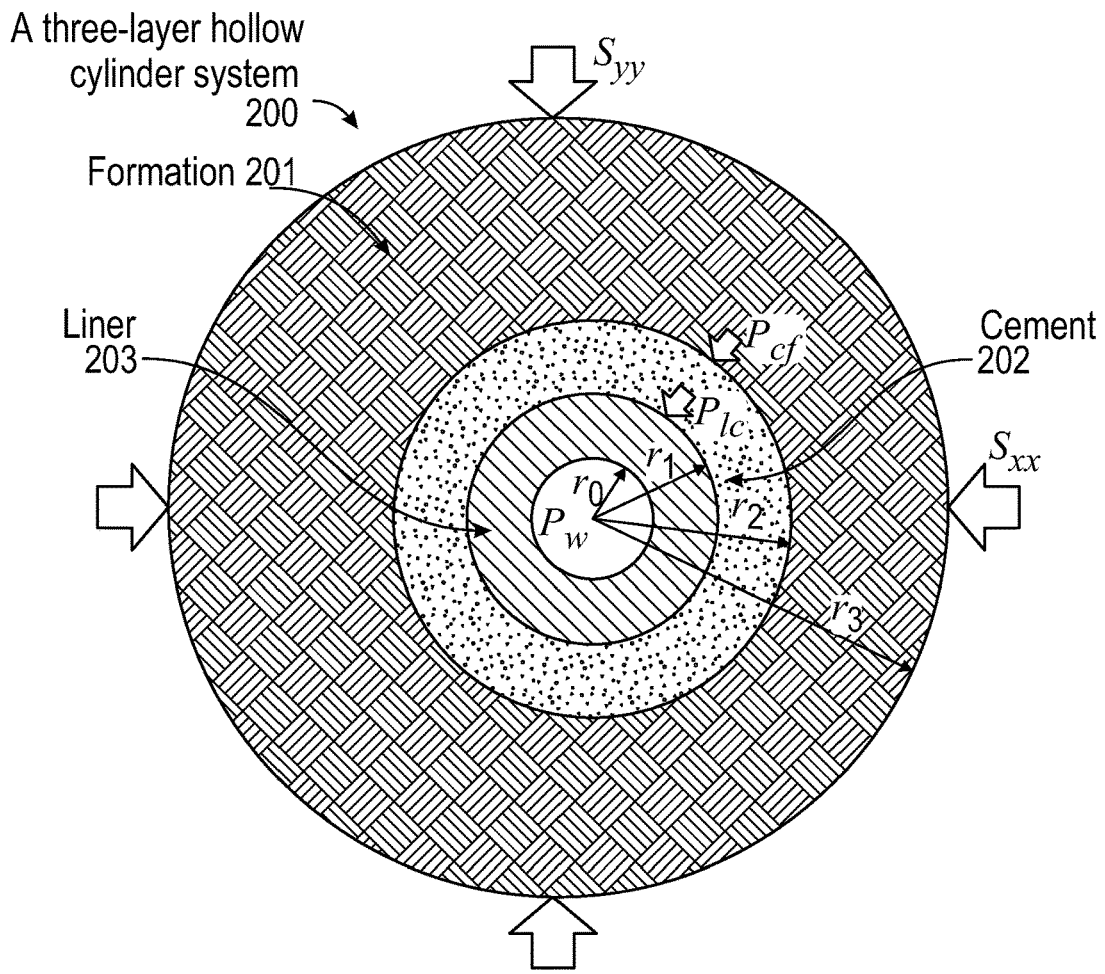
FIG. 2 shows a liner-cement-formation interaction system in accordance with one or more embodiments disclosed herein.

As described above, a liner is connected with geological formation or rock mass through a cementing layer. The magnitude and distribution of the load (i.e., $P_{lc}$) on the liner's outer boundary are decided by the thickness and mechanical properties of the cement layer, the mechanical properties of the geological layer, and the in-situ stresses and pore pressure. In other words, the magnitude and distribution of the load on the outer boundary of the liner is computed from a three-layer hollow cylinder system, as shown in FIG. 2. The three-layer hollow cylinder system (200) includes a formation (201) surrounding a wellbore. A cement layer (202) and a liner (203) form the other layers of the wellbore, and are surrounded by the formation.

The formation (201) may include a porous or fractured rock formation that resides underground, beneath the earth's surface. More specifically, the formation (201) may include different layers of rock having varying characteristics, such as varying degrees of permeability, porosity, capillary pressure, and resistivity. The rock formations (201) are aggregates of mineral grains or crystals. Hence, the properties of rock formation (201) may be determined by the properties of its minerals. Because many formations (201) may exhibit a considerable range in the minerals that make up the formations, the assignment of representative values for a particular property may be calculated using a statistical variation. The formation (201) is associated with both physical and mechanical properties. For example, physical properties of the rock formation may include density, permeability, porosity, underground fluid flow, viscosity, temperature and saturation, etc. Additionally, mechanical properties of the rock formation (201) may be elastic modulus, Poisson's ratio, etc. Poisson's ratio relates a material's response to an applied force in one direction with a dimensional change in another direction.

The cement layer (202), in one or more embodiments, may be a steel pipe or cement set inside a drilled wellbore to protect and support production of fluids to the surface. In addition to providing stabilization and keeping the sides of the wellbore from caving on themselves, the cement layer (202) may protect fluid production from outside contaminants, such as separating any fresh water reservoirs from fluids being produced through the cement layer (202). Mechanical properties associated with the cement layer (202) may be Young's modulus, Poisson's ratio, compressive and tensile strength, etc. Young's modulus describes the ability of the cement to resist deformation under stress. Additionally, the compressive and tensile strengths describe loading capacity of the cement layer (202) material under compressive and tensile stress loading mode.

As described above, the liner (203) is a tubular steel string that does not extend to the top of the wellbore. In one or more embodiments of this disclosure, a liner may be any structure that is a part of the three layer system, together with the cement and formation. For example, the liner can be an expandable liner, perforated liner, slotted liner, casing, etc. Additionally, the liner (203) may be suspended from inside the bottom of the previous casing string. The properties of the liner (203) may be a grade of the pipe, pressure resistance, radius of the liner and the liner's weight.

Each of the layers shown in FIG. 2 (201, 202, 203) have geometric parameters associated with them. Such geometric parameters may be, for example, the radii and measurements shown in FIG. 2, where $r_0$ represents the inner diameter of the liner (203), $r_1$ represents the outer diameter of the liner (203), $r_2$ represents the outer diameter of the cement layer (202), and $r_3$ represents the outer diameter of the formation (201). In one or more embodiments, each of the interfaces between two adjacent layers of the three concentric layers experience different stresses and loads. For example, the cement-formation interface between the cement layer (202) and the formation (201) may experience one set of stresses and loads, while the liner-cement interface between the liner layer (203) and the cement layer (202) experiences a different set of stresses and loads, depending on the properties of each of the three layers of the system. In FIG. 2, stress on the liner-cement interface is shown as $P_{lc}$ and the stress on the cement-formation interface is represented by $P_{cf}$. Stresses $S_{xx}$ and $S_{yy}$ represent far-field stresses acting on the entire liner-cement-formation system of FIG. 2. In a horizontal well, the stresses $S_{xx}$ and $S_{yy}$ are vertical and horizontal components of the in situ stress acting on the system.

Figure 3:
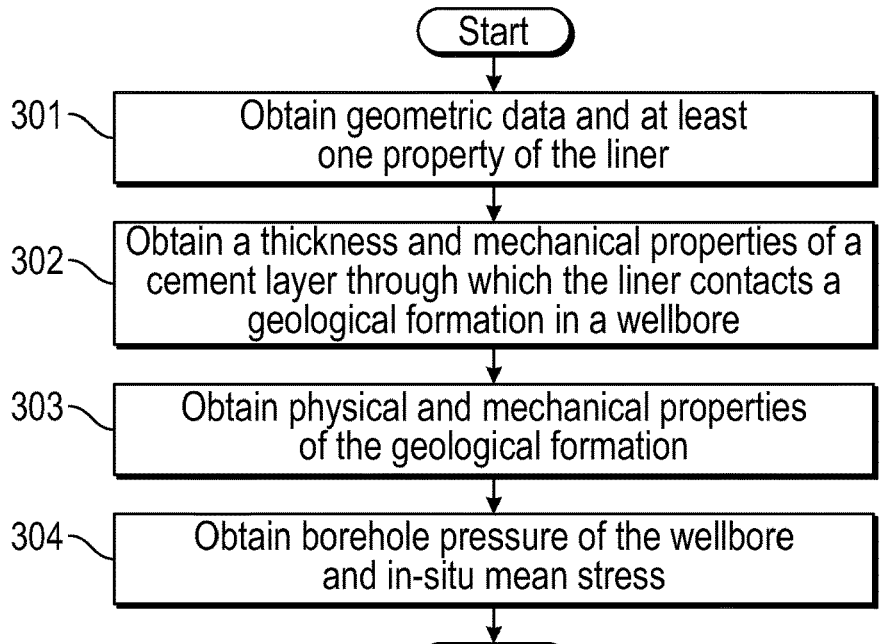
FIG. 3 shows a flowchart in accordance with one or more embodiments disclosed herein.

In one or more embodiments, to determine liner integrity, the loads and stresses experienced by the outer boundary of the liner are measured, modeled, and simulated to evaluate the liner integrity at various stages. FIG. 3 shows a flowchart describing a method for obtaining the necessary parameters to evaluate the integrity of the liner disposed in the wellbore, in accordance with one or more embodiments of the invention. While the blocks in FIG. 3 are presented and described sequentially, one of ordinary skill in the art will appreciate that some or all of the blocks may be executed in different orders, may be combined or omitted, and some or all of the blocks may be executed in parallel.

In Step 301, at least one property of the liner and its geometrical data are obtained. As stated above, the properties of liner may be a grade of the pipe, pressure resistance, radius of the liner and its weight. The properties of the liner may be found in a specification of the liner tube, such as the technical data sheet of the liner. Additionally, properties of the liner may be determined by conducting an experiment or a simulation.

In Step 302, a thickness and mechanical properties of a cement layer, through which the liner contacts a geological formation in a wellbore, are obtained. The thickness of a cement layer is determined in the design of the wellbore. Additionally, the thickness of the cement layer may be calculated by subtracting the diameter of the liner from the diameter of the well hole. The mechanical properties of the cement layer may be estimated from a cement bond log. The cement bond log is a log that uses the variations in amplitude of an acoustic signal traveling down the casing wall between a transmitter and receiver to determine the quality of cement bond on the exterior casing wall.

In Step 303, physical and mechanical properties of the geological formation are obtained. These properties of the formation may be obtained from a plurality of tests. For example, the properties may be obtained using sonic measurements, seismic measurements, density logs or rock mechanics testing. The rock mechanics testing may be done on formation samples obtained before or during drilling operations in a lab. Some properties of the formation, for example tensile strength, may be obtained from minifrac well tests, where the fluid pressure is increased until small fractures are generated.

In Step 304, a borehole pressure of the wellbore and an in-situ mean stress are obtained. The borehole pressure is a pressure inside a wellbore introduced by drilling mud, injected fluid or produced fluids. The in situ stresses may be obtained is obtained by examining at deviations of the seismic velocity from a linear trend. The minimum in situ stress may be obtained from leak off tests. The leak off tests may be conducted immediately after drilling. During the test, the well is shut in and fluid is pumped into the wellbore to gradually increase the pressure that the formation experiences. At certain borehole pressure, fluid will enter the formation, or leak off, either moving through permeable paths in the rock or by creating a space by fracturing the rock. Vertical in-situ stress, and in many cases the horizontal in-situ stresses, are developed due to weight of the overlying materials. Additionally, in-situ stresses may be developed due to the confinement and the past stress history at a point below the rock surface of the undisturbed rock mass. The in-situ stress may be obtained using the average density of the overburden to calculate the vertical stress, and a measure of fracture closure pressure from a fracturing test in the borehole to estimate the minimum horizontal stress.

Those skilled in the art will appreciate that while FIG. 3 provides examples of the properties of each layer of the liner-cement-formation hollow system, embodiments disclosed herein are not limited to the properties and geometric data described above. Other properties of each layer may also be obtained to acquire more data that may be used to evaluate liner integrity without departing from the scope disclosed herein.

Figure 4A:
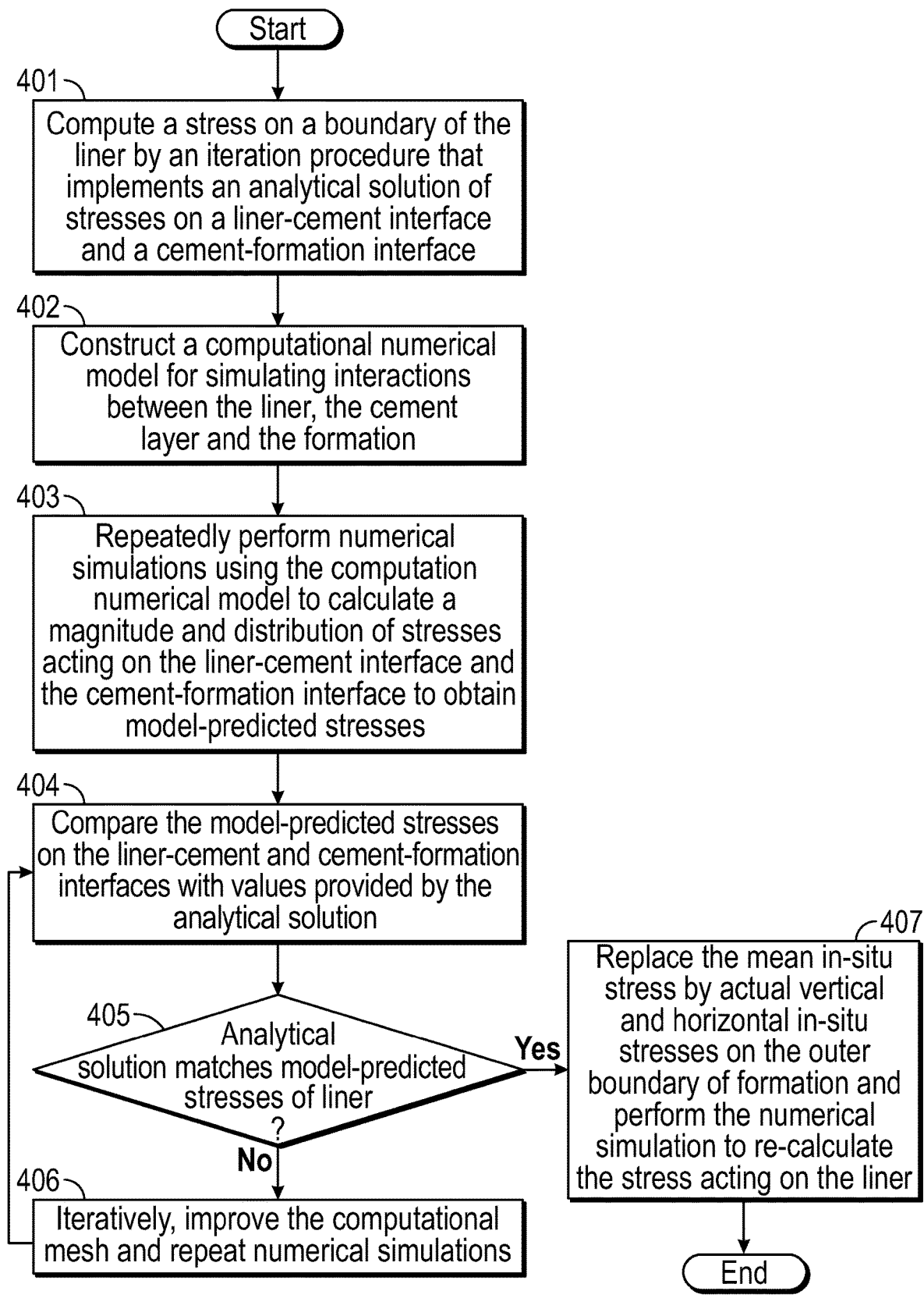
FIGS. 4A and 4B show flowcharts in accordance with one or more embodiments of the invention.

FIG. 4A shows a flowchart describing a method for evaluating an integrity of the liner disposed in the wellbore that contacts the formation through the cement layer between the liner and the formation, in accordance with one or more embodiments of the invention. Specifically, FIG. 4A shows a flowchart for evaluating liner integrity using the data collected in FIG. 3. While the various blocks in FIG. 4A are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively. Those skilled in the art will further appreciate that FIG. 3 and FIG. 4 may be performed simultaneously or in parallel.

Figure 4B:
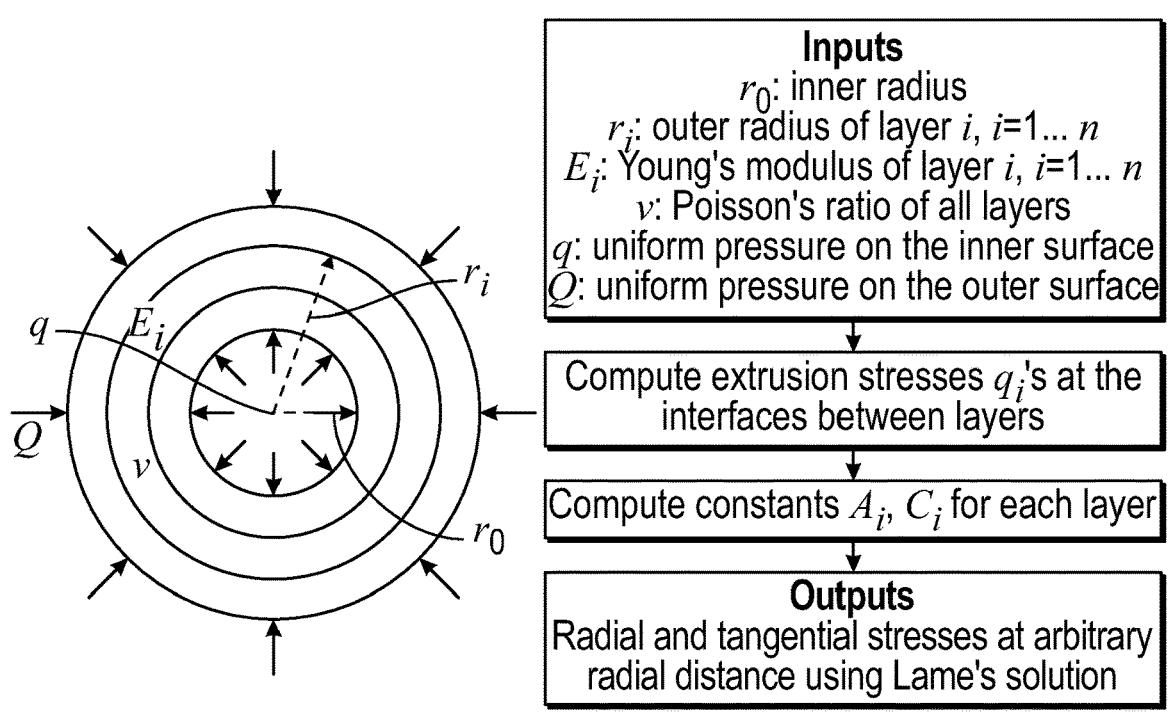

In Step 401, a stress on an outer boundary of the liner is computed. The computation is performed by an iteration procedure that implements an analytical solution of stresses on a liner-cement interface and a cement-formation interface. The analytical solution, also called a closed-form solution, is a mathematical solution in the form of math proven expressions. The analytical solution is a three-layer one-dimensional axisymmetric model with borehole pressure at one end and mean stress acting on the other end. As the analytical solution is presented as math expressions, it offers a clear view into how variables and interactions between variables affect the result. In one or more embodiments of the disclosure, the analytical solution is computed using a Mathematica iteration procedure. Mathematica is a powerful technical computing program capable of handling most numerical computations. It may include neural networks, machine learning, image processing, geometry, data science, visualizations, etc. In one or more embodiments, the procedure is implemented into a Mathematica program following the flowchart in FIG. 4B. Specifically, FIG. 4B shows, on the left side, the input values taken from the concentric multi-layer elastic medium subjected to uniform loads on the inside and outside boundaries.

In one or more embodiments, the analytical solution is computed by obtaining the diameters of layers, Young's modulus and Poisson's ratio of all layers and uniform pressure on inner and outer surface. These input values ($r_0$, $r_i$, $E_i$, v, q, and Q) are used in the flow diagram on the right side of FIG. 4B to obtain the analytical solution using the iterative Mathematica procedure. The extrusions stresses are computed at the interfaces between the layers. The output of the procedure are radial and tangential stresses on liner-cement and on cement-formation interfaces. Specifically, extrusion stresses are computed on the interfaces of the 3-layer liner-cement-formation system using the input values. The geometry of the three-layered liner-cement-formation system is defined by four radii: r0, r1, r2, and r3. R0 and r1 are the inner and outer radii of liner, r1 and r2 are the inner and outer radii of cement layer, while r2 and r3 are the inner and outer radii of formation layer. Each layer has its own Young's modulus as a mechanical property input. The three-layered system is loaded by a uniform pressure (q) inside the liner and another uniform pressure (Q) on the outside of formation layer. The output of this computational procedure includes the normal stress along the interfaces between the liner and cement, and between the cement and formation. Next, constants $A_i$, $C_i$ are computed. Although the explicit expressions of stresses and displacements can be solved, they will look very lengthy and complicated if there are many layers. To simplify applications for their solutions in general cases, the analytical stress and displacement solutions of the multi-layer elastic hollow cylinders may be computed using an iterative procedure for a cylinder problem with an arbitrary number of concentric layers.

Those skilled in the art will appreciate that other programs, such as Matlab, may also be used to perform an iterative procedure to obtain the closed-form analytical solution for the stresses experienced by the outer boundary of the liner.

In Step 402, a computational numerical model for simulating interactions between the liner, the cement layer and the formation is constructed. The computational numerical model is a mathematical model that uses numerical time-stepping procedure to obtain the models behavior over time. With computational numerical models, the solutions to equations which are difficult to solve directly may be approximated. In one or more embodiments, the computational numerical model used to evaluate liner integrity may be a two-dimensional liner-cement-formation computational mechanics model. The borehole pressure inside the wellbore and the mean in-situ stress on the outside boundary of formation are applied to this model. An example of the computational mesh for numerical modeling liner-cement-formation system is displayed in FIG. 4C and FIG. 4D.

In Step 403, the numerical simulations are repeatedly performed on computational meshes with increasing resolution, using the computational numerical model to calculate a magnitude and distribution of stresses acting on the liner-cement interface and the cement-formation interface to obtain model-predicted stresses. An example of an initial contour of radial stress and tangential stress are shown in FIG. 4E and FIG. 4F, respectively. FIGS. 4G and 4H show the initial close-up views of radial and tangential stress contours.

In the field condition, the confining stresses in vertical and horizontal directions may not be equal.

In Step 404, the model-predicted stresses on the liner-cement and cement-formation interfaces are compared with values provided by the analytical solution. That is, the stresses output by the computational numerical model in Steps 402-403 are compared to the closed-form analytical solution obtained iteratively in Step 401. In Step 405, a determination is made as to whether the analytical solution matches the numerical model-predicted stresses of the liner. The match may be an exact match, or a substantial match.

In Step 406, if the analytical solution does not match the numerical model-predicted stresses of liner, the computational mesh of the computational numerical model is improved and numerical simulations are repeated. From Step 406, the process loops back to Step 404, as shown in FIG. 4A. The iterations of parameter adjustments are performed until the analytical solution matches the numerical model-predicted stresses of the liner.

In Step 407, on the computational mesh on which the numerical simulation gives same contact stress as analytical solution, the actual confining stress in vertical and horizontal directions, if they are different from each other, are applied on the outer boundary (to replace the mean stress there) of the geological formation layer, then the system is solved to equilibrium. The example contours of the radial stress and tangential stress, after the adjustment, are shown in FIG. 4I and FIG. 4J. Their close-up views are shown in FIG. 4K and FIG. 4L. Additionally, FIG. 4M shows the distribution curve of stress, pressure, on the interfaces between liner-cement and cement-formation. In this example, to the unequal stress loading, the stress demonstrates sinusoidal distribution on both liner-cement and cement-formation interfaces. The influence of other factors, such as material properties and behaviors, additional engineering conditions, on the pressures acting on the liner may be further evaluated. For example, strength properties of cement and formation, such as cohesion, friction angle and tensile strength, may be assigned to the corresponding materials in this model. The model may be run into equilibrium to re-calculate the pressure on the liner. Additionally, effect of wellbore pressure change can be tested. For example, FIG. 4N shows the stress distributions along the formation-cement and cement-liner interface in the wellbore in which the pressure is reduced to zero and the model is ran into equilibrium. The calculated stresses acting on the liner are applied to a liner integrity evaluation model to determine an integrity of the liner at various of stages of the wellbore. The pressure distribution on the outer boundary of liner, the liner-cement interface, in combination with the fluid pressure inside the wellbore, may be used to evaluate the integrity of the selected liner in a standalone liner model. Alternatively, if the mechanical strength properties of the liner material are known and assigned in this liner-cement-formation model, the integrity of the liner can be evaluated directly in this three-layer model. In Step 407, the stress conditions on the outer boundary of the formation layer in the computational numerical model may be changed to calculate the stress on the outer boundary of the liner. Further, material properties and conditions corresponding to engineering procedures may be updated the stress on the outer boundary of the liner may be calculated thereafter. The output of the liner integrity evaluation model may be used to determine the integrity of the liner over the course of the life of the well, at different stages of oil production.

Using FIGS. 4A-4N as described above, the following is an example of evaluating liner integrity using the method of FIG. 4A with numerical values and specific measurements. This example is for illustrative purposes only and those skilled in the art will appreciate that embodiments of this disclosure are not limited by the example below.

A Demonstrative Example

A horizontal well with diameter of 14.92 cm (4.875 inches) is used to demonstrate embodiments of this disclosure. The inner layer of the well is liner, and the annulus between borehole wall and liner is filled with cementing material. The borehole is drilled in the minimum horizontal stress direction. The vertical stress ($S_V$) is 160 MPa, the maximum horizontal stress ($S_H$) is 120 MPa, the minimum horizontal stress ($S_h$) 90 MPa, and the fluid pressure inside the borehole and liner ($P_w$) is 50 MPa.
The geometric parameters (see FIG. 2) are as follows:
$r_0$=9.72 cm (Inner diameter of liner)
$r_1$=11.43 cm (Outer Diameter of liner)
$r_2$=14.92 cm (Outer Diameter of cement layer)
$r_3$=50.8 cm (Outer Diameter of formation layer)
The Young's moduli and Poisson's ratios of these layers are:
Liner layer: $E_1$=200 GPa; $v_1$=0.3
Cement layer: $E_2$=10.34 GPa; $v_2$=0.3
Formation layer: $E_3$=41.38 GPa; $r_3$=0.3
Step 401. The Analytical Solution Put the above input parameters (note, the average of Sxx and Syy is applied to the outer boundary of the formation layer) to the Mathematica program of the analytical solutions implemented following the procedure in the flowchart in FIG. 4B reported that the stress on the interface between the liner and cement ($P_{lc}$) is 114.6 MPa and the stress on the interface between the cement and formation ($P_{cf}$) is 105.3 MPa, that is:

$P_{lc\text{-}ana}$=114.6 MPa $P_{cf\text{-}ana}$=105.3 MPa

Step 2. Numerical Model Buildup and Verification

Figure 4C:
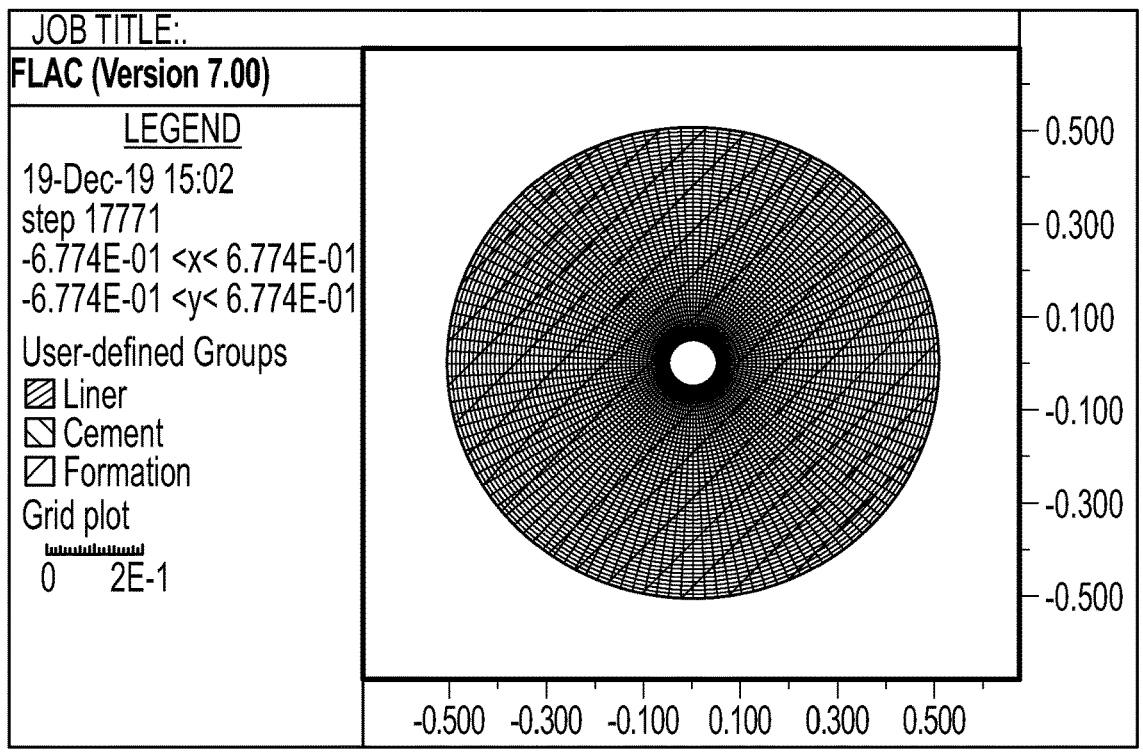
FIGS. 4C-4N show example graphs in accordance with one or more embodiments disclosed herein.
Figure 4D:
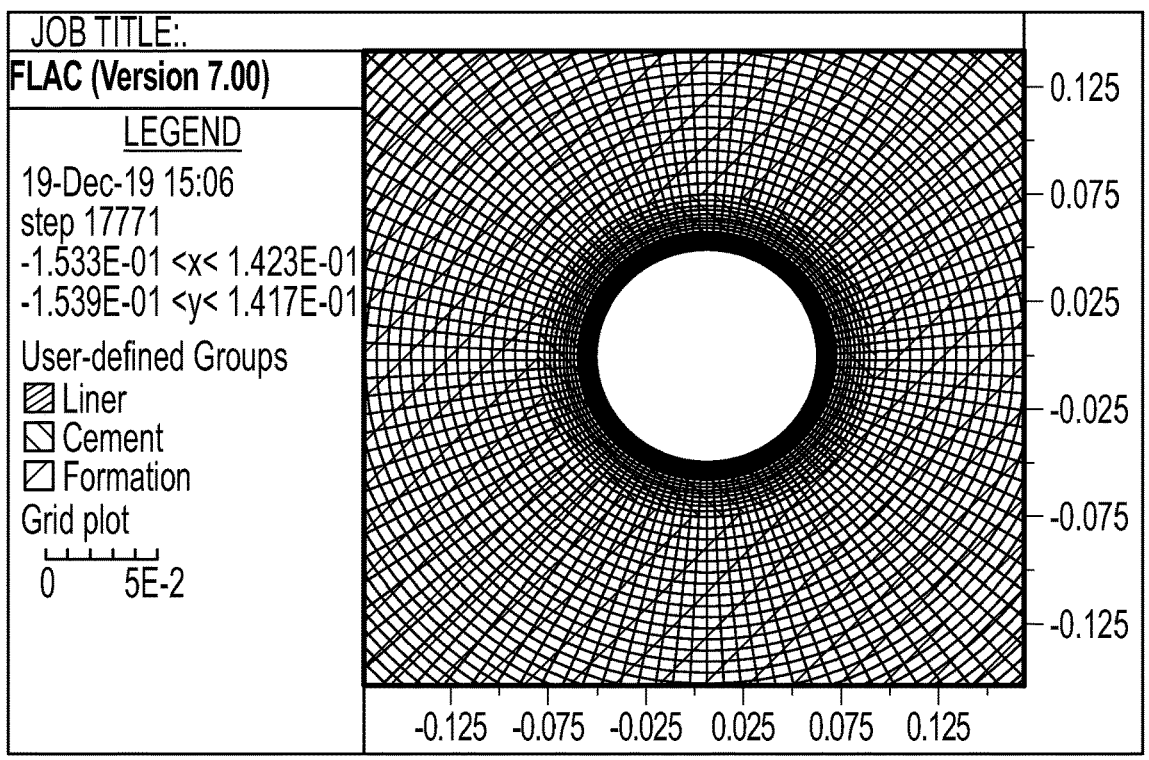
Figure 4E:
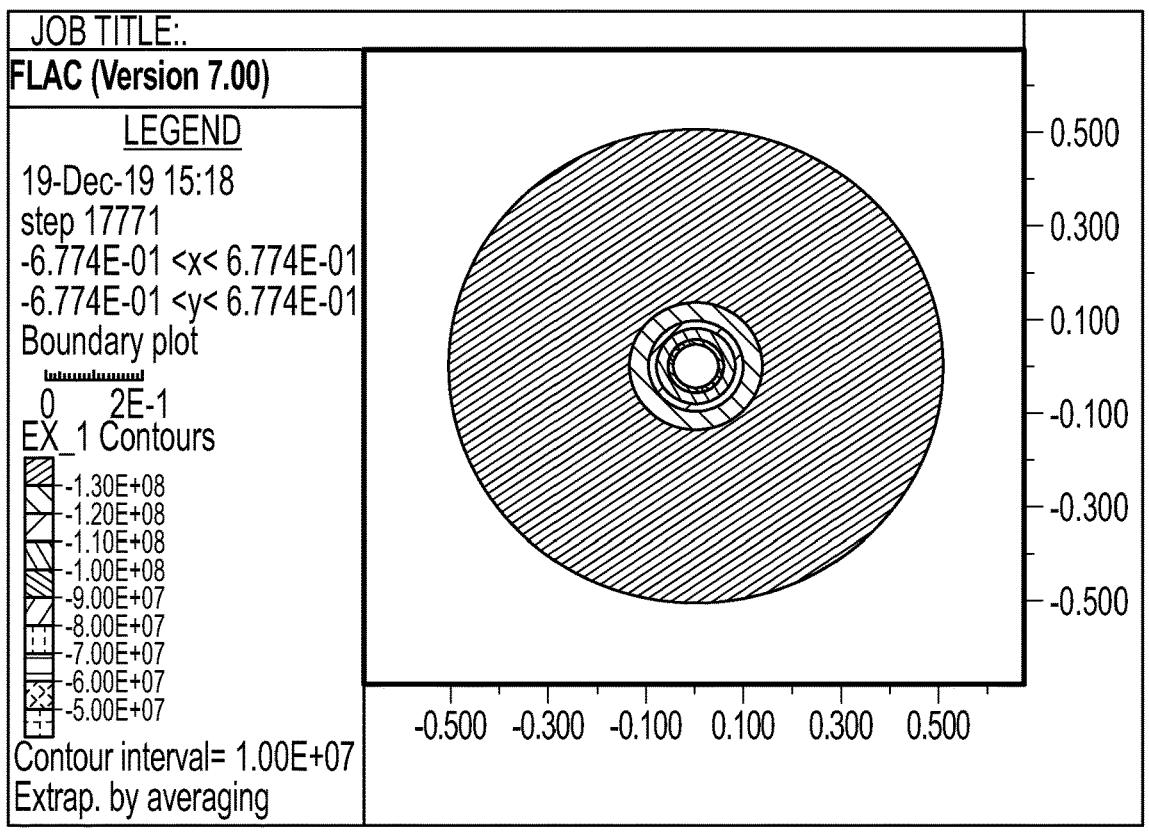
Figure 4F:
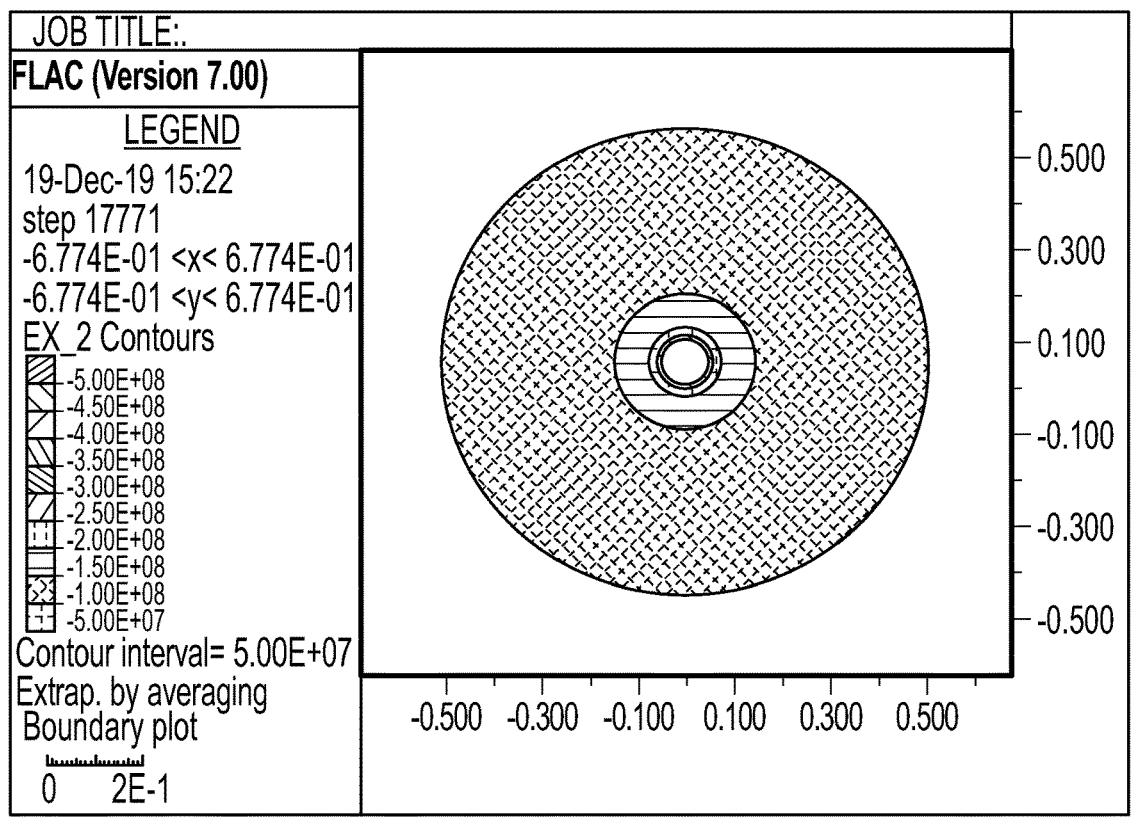
Figure 4G:
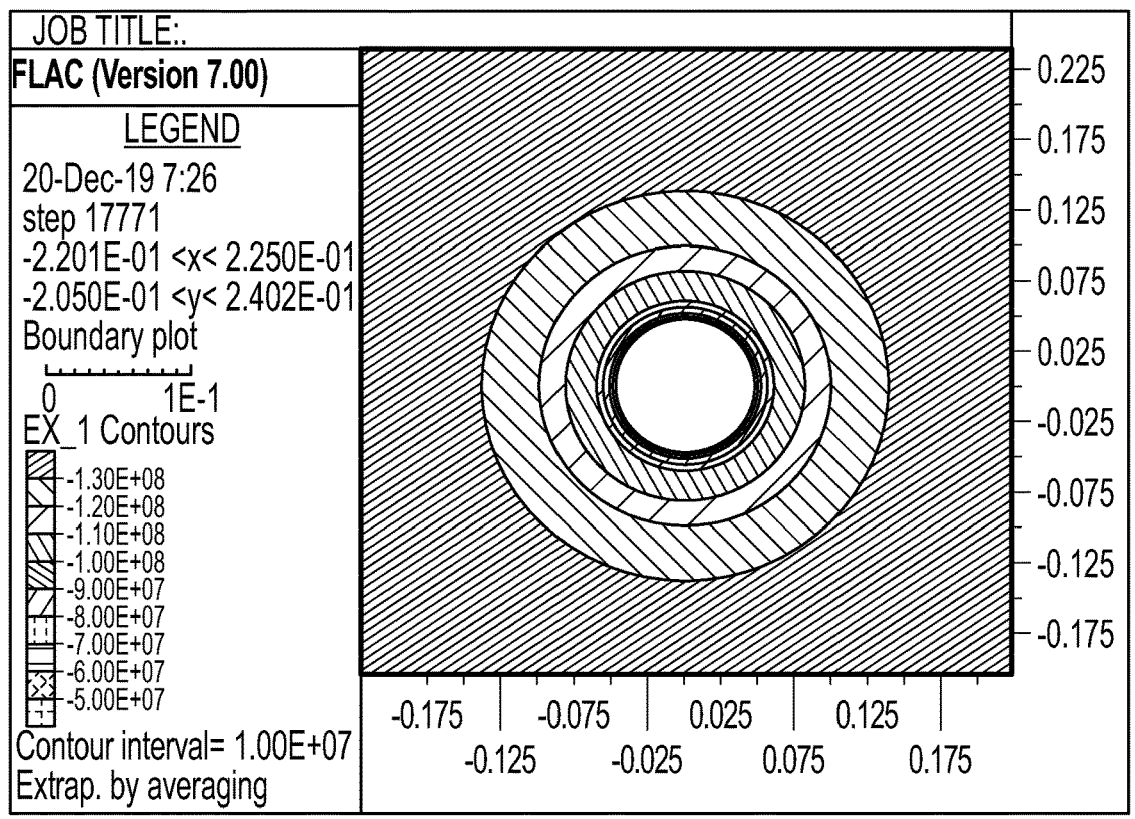
Figure 4H:
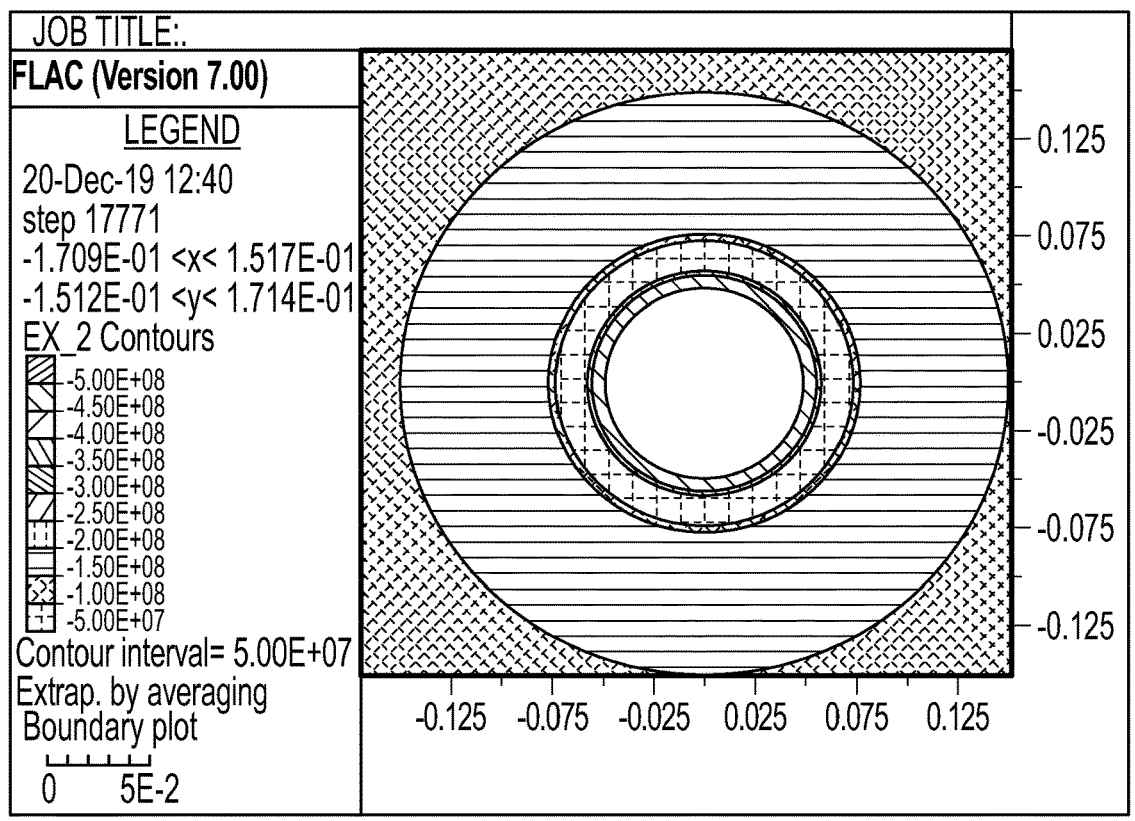
Figure 4I:
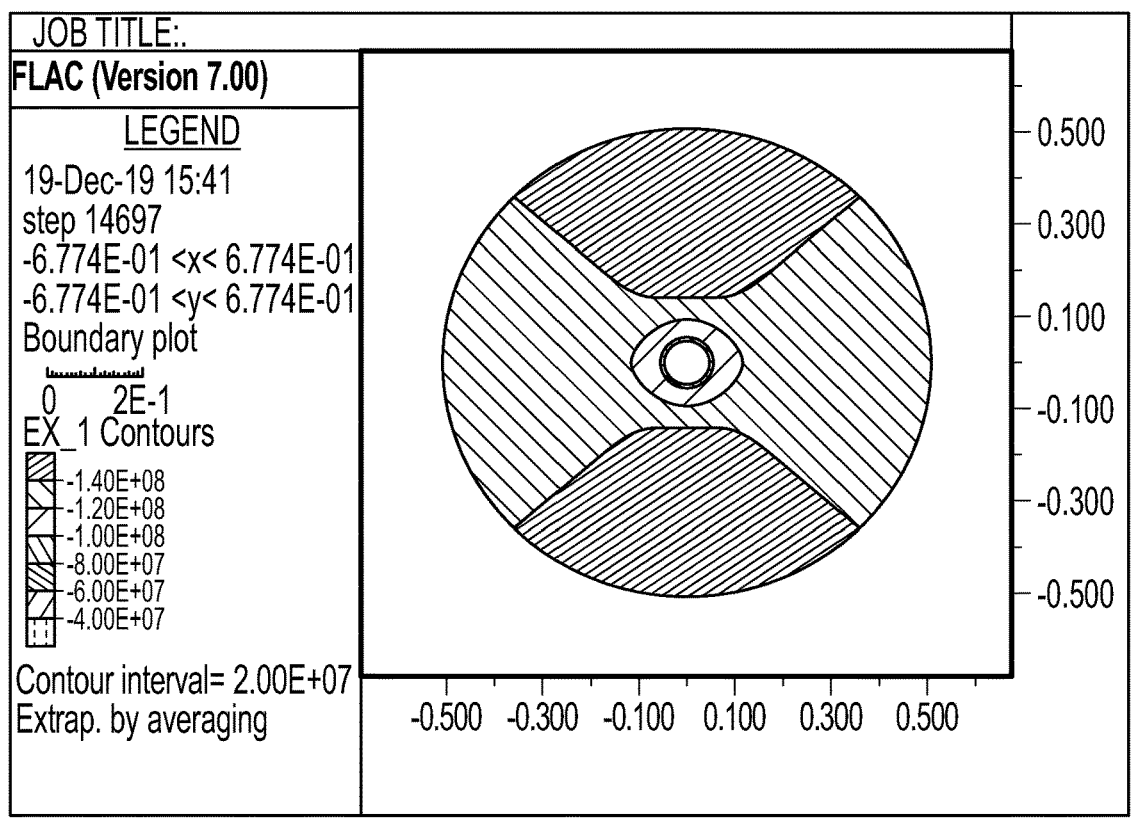
Figure 4J:
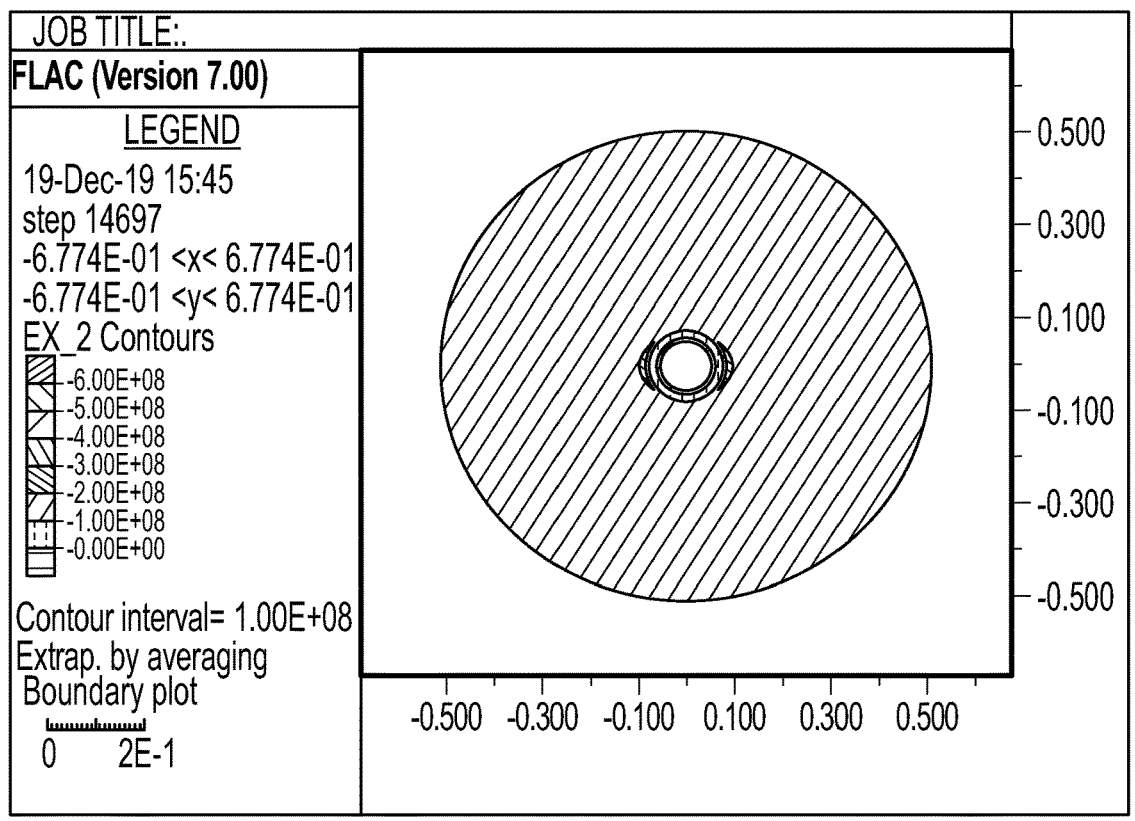
Figure 4K:
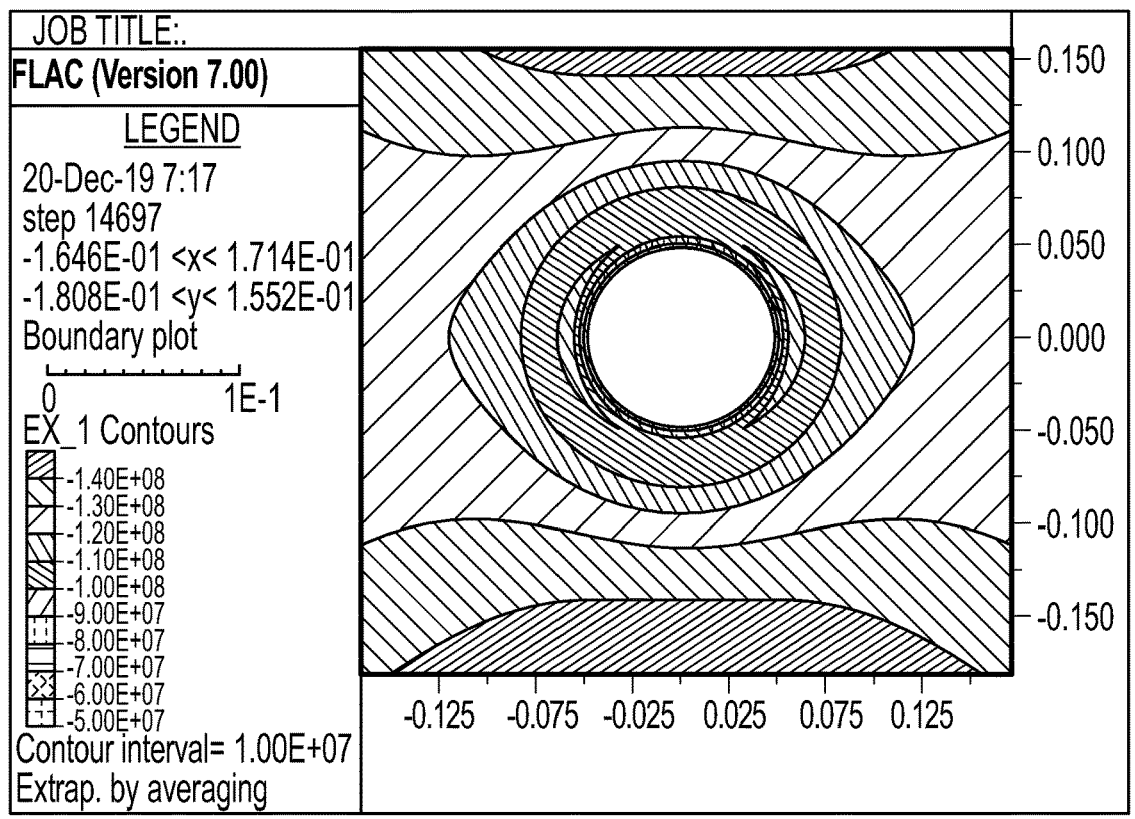
Figure 4L:
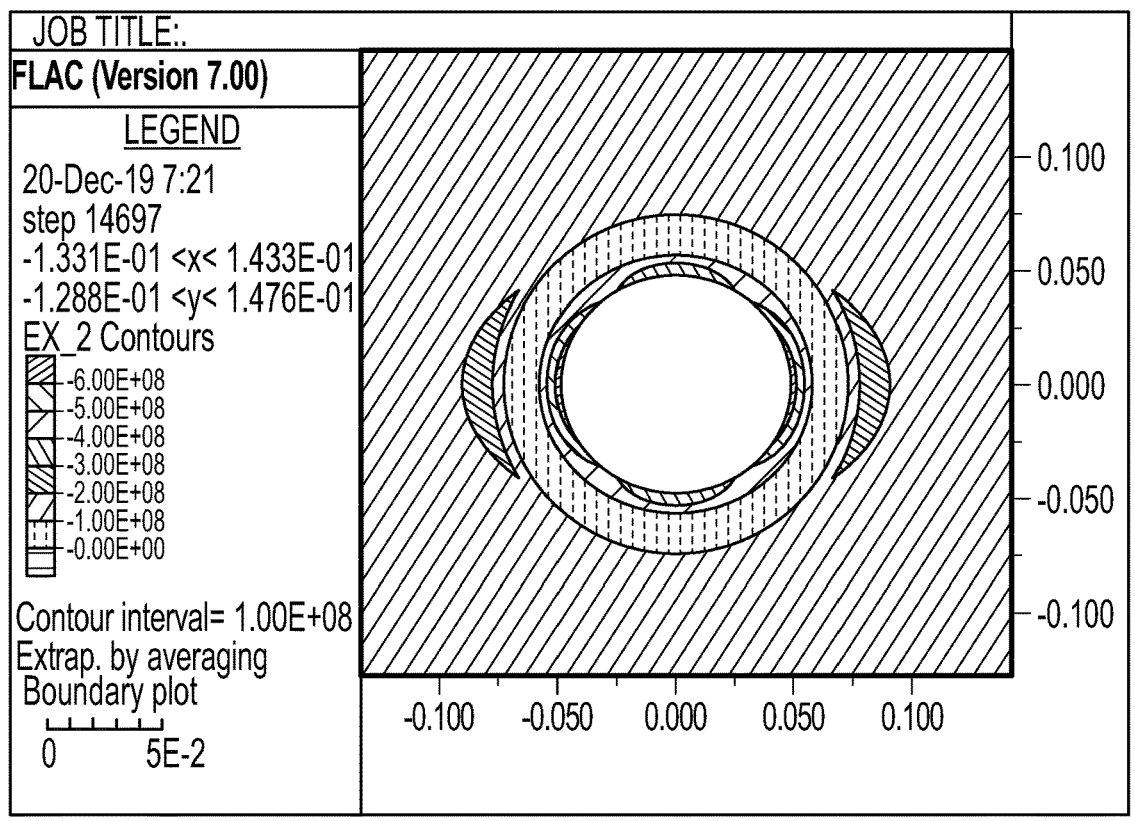
Figure 4M:
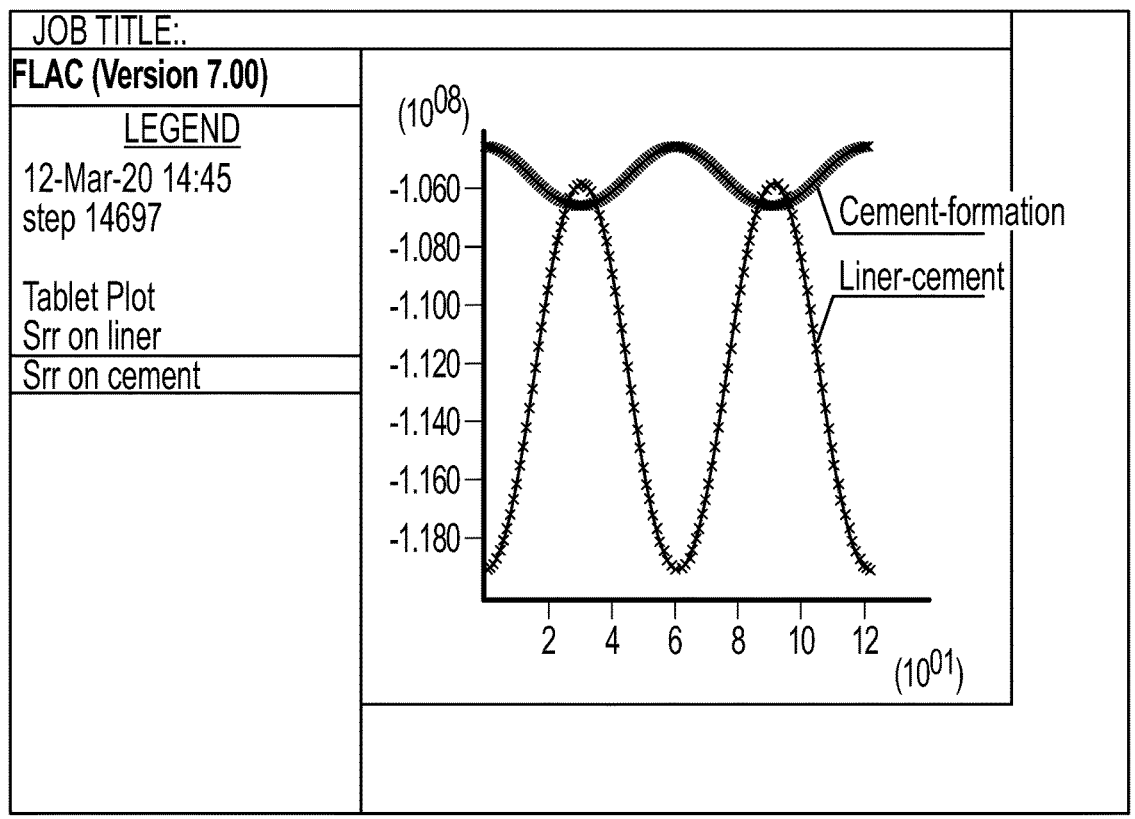
Figure 4N:
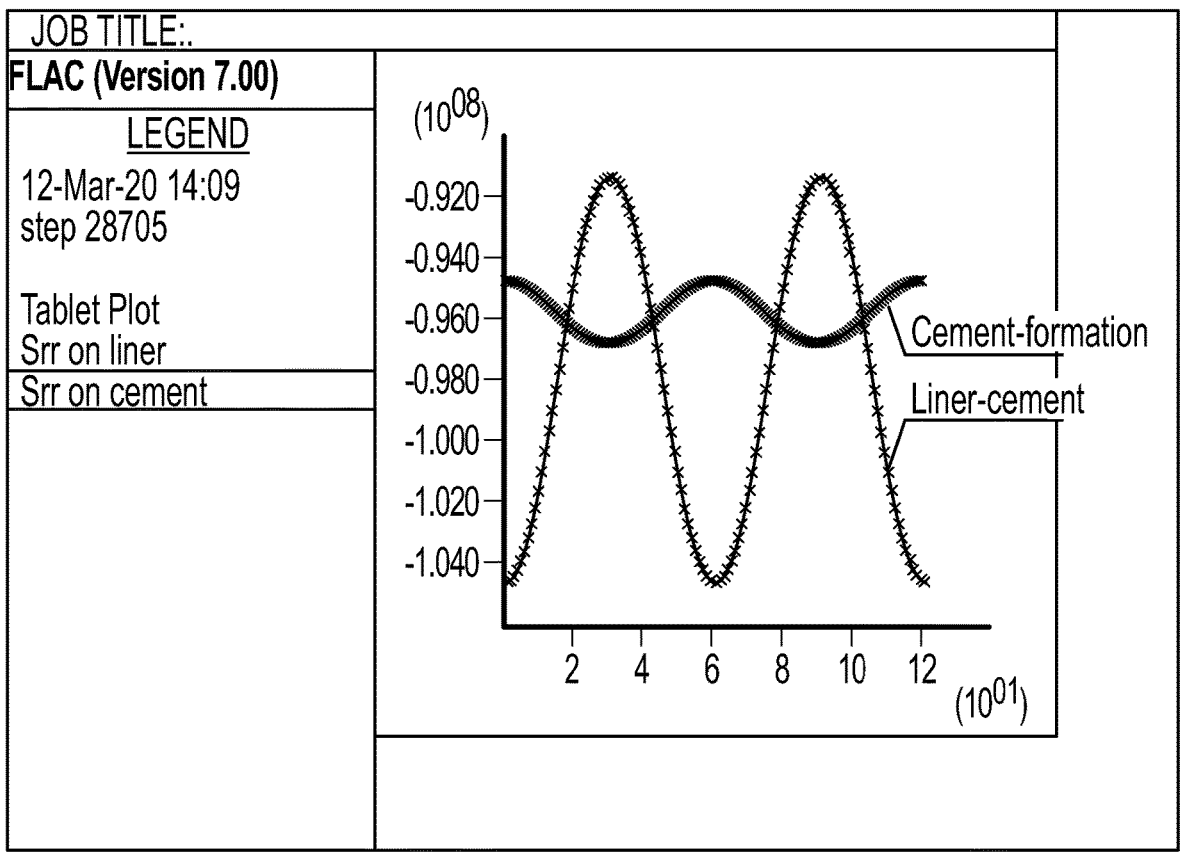

The computational mesh for modeling liner-cement-formation system is displayed in FIG. 4C. All three layers have 120 elements in circumferential direction. Radially, the inner layer has 10 elements with inner radius of 9.72 cm and outer radius of 11.43 cm, the cement layer also has 10 elements spanning 11.43 cm to 14.92 cm (i.e., annulus between liner and borehole wall), and the formation layer has 60 elements extending to 50.8 cm (i.e., 20 inches). The close-up view of the computational mesh around the liner is shown in FIG. 4D.

After the elastic materials of liner, cement and formation are filled into the mesh, a pressure of 50 MPa is applied inside the liner and a pressure of 140 MPa is applied on the outer boundary of the formation layer, the model is solved to the equilibrium. The contour of radial stress and tangential stress is presented in FIG. 4E and FIG. 4F, respectively. FIGS. 4G and 4H show the close-up views of radial and tangential stress contours. Clearly, both radial and tangential stresses are axisymmetric.

Printout information shows that the radial stress on the interface between the liner layer and cement layers ($P_{lc}$) and the stress on the interface between the cement layer and the formation layer ($P_{cf}$) are:

$P_{lc\text{-}num}$=112.4 MPa $P_{cf\text{-}num}$=105.6 MPa

Since both the layers and loading conditions are axisymmetric, the stresses on the interfaces between layers are same everywhere along the same interface. Comparison with their corresponding analytical solutions show that the differences between the numerical and analytical solutions are trivial at both locations, e.g., on the interface between the liner and cement layers, the difference is less than 2%; on the interface between the cement and formation layers, the difference is less than 0.3%. It may be concluded that the resolution of the selected computational mesh is sufficiently fine to capture mechanical responses of this three-layer system including the mechanical behaviors of each layer and the interactions among them.
Step 3. Correction for Unequal Stress Loading In the field condition, the confining stresses in vertical and horizontal directions are usually not equal. In this case, the vertical stress is 160 MPa and the horizontal stress is 120 MPa, as described above.

The confining stress on the outer boundary of the formation layer is increased by 20 MPa in vertical direction and decreased by 20 MPa in horizontal direction then run the model into equilibrium. The contours of the radial stress and tangential stress are provided in FIGS. 4I and 4J. Their close-up views are displayed in FIG. 4K and FIG. 4L presents the distribution curve of stress (pressure) on the interfaces between liner-cement and cement-formation. Due to the unequal stress loading, the stress demonstrates sinusoidal distribution on both liner-cement and cement-formation interfaces, with averaged values of 112.4 MPa and 105.6 MPa respectively, which are same as the values under uniform confining stress of 140 MPa, as reported above. Note the sign convention for stress is positive in tension and negative in compression.

The influence of other factors, such as material properties and behaviors, additional engineering conditions, on the pressures acting on the liner may be further evaluated. For example, strength properties of cement (e.g., cohesion of 17 MPa, friction angle of 35° and tensile strength of 2 MPa) and formation (e.g., cohesion of 26 MPa, friction angle of 30° and tensile strength of 8 MPa) can be assigned to the corresponding materials in this model which is then run into equilibrium to re-calculate the pressure on the liner. In this particular situation, there is no plastic yielding in the model, so the pressure on the liner does not change. Similarly, the effect of wellbore pressure change may be tested. For instance, if the wellbore pressure is reduced to zero and the model is re-run into equilibrium, the stress distributions along the formation-cement and cement-liner interface are displayed in FIG. 4M. Due to the reduction of wellbore pressure, the average normal stress acting on the outer boundary of liner drops by 14.5 MPa. Note, in this situation the liner is in more critical state because there is no supporting pressure inside the liner.

Step 4. Liner Integrity Evaluation

The pressure distribution on the outer boundary of liner, that is, the stresses on the liner-cement interface in FIGS. 4M and 4N, in combination with the fluid pressure inside the wellbore, can be used to evaluate the integrity of the selected liner in a standalone liner model. Alternatively, if the mechanical strength properties of the liner material are known and assigned in this liner-cement-formation model, the integrity of the liner can be evaluated directly in this three-layer model.

Figure 5:
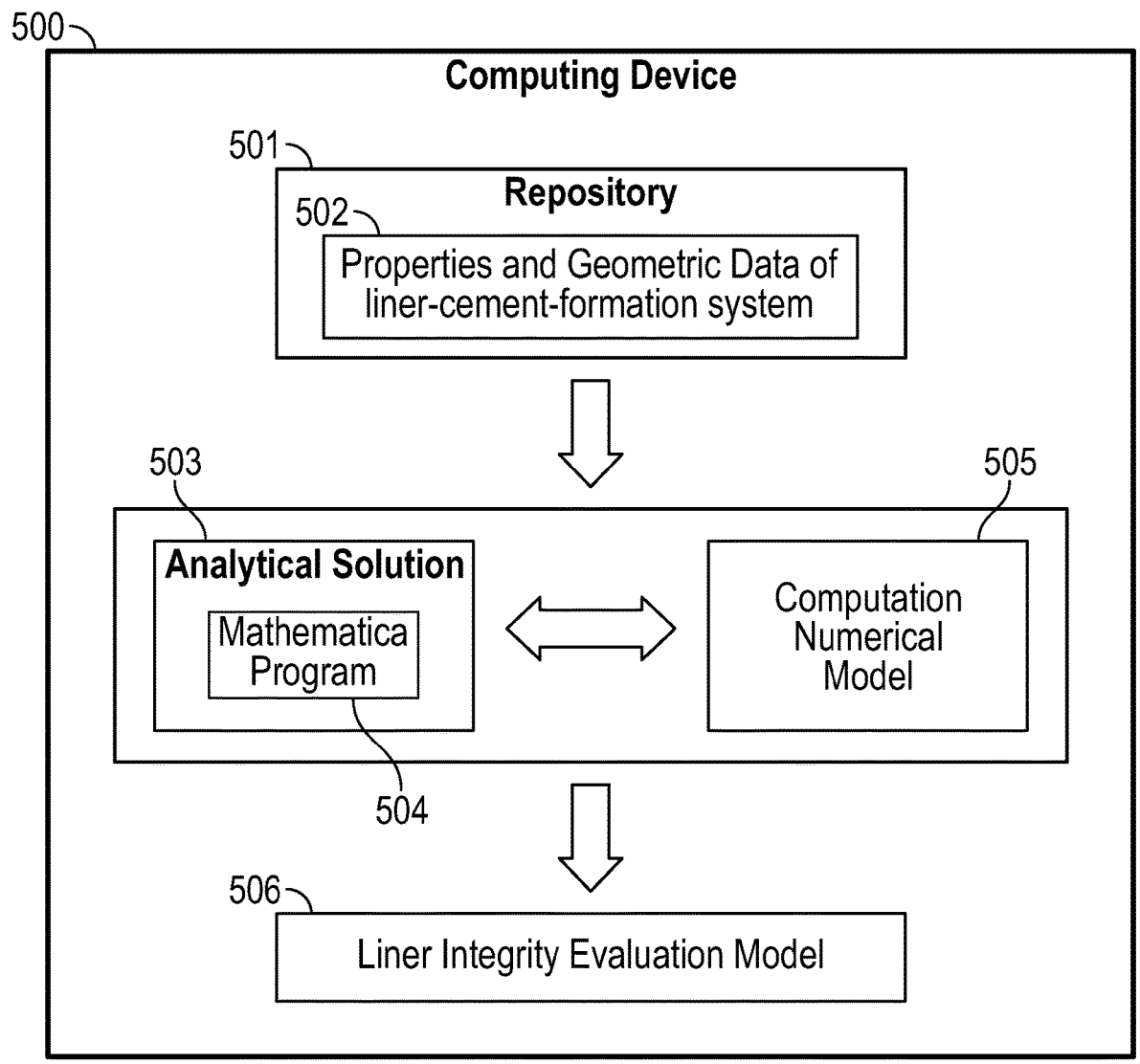
FIG. 5 shows a computing device for modeling and simulating magnitude and distribution of the load on the liner's outer boundary in accordance with one or more embodiments disclosed herein.

FIG. 5. shows a computing device (500) in accordance with one or more embodiments. The computing device (500) may be used to execute the method for evaluating the integrity of the liner. Any combination of mobile, desktop, server, router, switch, embedded device, or other types of hardware may be used. The computing device (500) may be any computer, tablet, thin computer, or any other device with computational power having a processor (not shown) and memory (non-persistent storage, volatile memory, such as random access memory (RAM), cache memory, persistent storage (e.g., a hard disk, an optical drive such as a compact disk (CD) drive or digital versatile disk (DVD) drive, a flash memory, etc.)), a communication interface (e.g., Bluetooth interface, infrared interface, network interface, optical interface, etc.), and numerous other elements and functionalities. The computer processor(s) (not shown) may be an integrated circuit for processing instructions. For example, the computer processor(s) may be one or more cores or micro-cores of a processor. The computing system (500) may also include one or more input devices, such as a touchscreen, keyboard, mouse, microphone, touchpad, electronic pen, or any other type of input device.

The communication interface of the computing system may include an integrated circuit for connecting the computing system to a network (not shown) (e.g., a local area network (LAN), a wide area network (WAN) such as the Internet, mobile network, or any other type of network) and/or to another device, such as another computing device.

Further, the computing system (500) may include one or more output devices (not shown), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s), non-persistent storage, and persistent storage. Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by the processor(s) of the computing device (500), is configured to perform one or more embodiments of the disclosure.

The computing device (500) of FIG. 5 may include a repository (501) stored in memory that will store properties and geometric data of liner-cement-formation system (502). The repository (501) will provide data for two computing modules. The computing modules are analytical solution (503) and computational numerical model (505). The analytical solution uses Mathematica software (504) for computing the iterative procedure. Based on calculations from the computing models, a liner integrity evaluation model (506) is evaluated.

The repository (501), in one or more embodiments, is used to store the properties and the geometric data. For example, the repository may be a database. The database is a collection of information configured for ease of data retrieval, modification, re-organization, and deletion. Database Management System (DBMS) is a software application that provides an interface for users to define, create, query, update, or administer databases. The repository (501) may be updated with the properties and the geometric data when the well is designed or after conducting the tests. As mentioned above, the properties and the geometric data of liner-cement-system may be obtained from at least a manual, a material specification, a well design or testing.

Analytical solution (503) and computational numerical model (505) are part of the computing modules. As mentioned above, the analytical solution (503) is computed by obtaining the diameters of layers, Young's modulus and Poisson's ratio of all layers and uniform pressure on inner and outer surface. These parameters may be obtained from the repository. A part of the analytical solution (503) is Mathematica software (504). Mathematica software (504) is used to compute the stress on the outer boundary of the liner, treating it as a three-layer one-dimensional axisymmetric model with borehole pressure at one end and mean stress acting on the other end. The computational numerical model (505) is a two-dimensional liner-cement-formation computational mechanics model, wherein the borehole pressure is applied inside the wellbore and mean in-situ stress is applied on the outside boundary of formation. The analytical solution (503) and computational numerical model (505) are compared after every iteration, until they match. After every unsuccessful iteration, the resolution of the computational numerical model (505) is adjusted and the procedure is repeated. After the numerical model results match with the analytical solution, the computational mesh is fixed. If the actual vertical stress is different from horizontal stress, then apply them on the outer boundary of formation layer (to replace the mean stress there) and solve the model to equilibrium. The calculated stress/pressure on the outer boundary of liner will be used to evaluate the integrity of liner.

The liner integrity evaluation model (506) may be used to evaluate liner integrity by using the pressure distribution on the outer boundary of liner, in combination with the fluid pressure inside the wellbore. Alternatively, if the mechanical strength properties of the liner material are obtained in liner-cement-formation model, the integrity of the liner can be evaluated directly in three-layer model.

The computing system (500) in FIG. 5 may be connected to or be a part of a network. For example, the network may include multiple nodes. Each node may correspond to a computing system, such as the computing system shown in FIG. 5, or a group of nodes combined may correspond to the computing system shown in FIG. 5. Each node may run a different part of the models/simulations to evaluate liner integrity. Further, one or more elements of the aforementioned computing system (500) may be located at a remote location and connected to the other elements over a network.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

Although multiple dependent claims are not introduced, it would be apparent to one of ordinary skill that the subject matter of the dependent claims of one or more embodiments may be combined with other dependent claims.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method for evaluating an integrity of a liner disposed in a wellbore that contacts a formation through a cement layer between the liner and the formation, the method comprising:
obtaining geometric data and at least one property of the liner using at least one of a sonic measurement, a seismic measurement, a density log and a rock mechanics testing;
determining, by a computer processor, in-situ stress and pore pressure on the formation;
computing, by the computer processor, a stress on a boundary of the liner by an iteration procedure that implements an analytical solution of stresses on a liner-cement interface and a cement-formation interface using the geometric data, the at least one property, mean in-situ stress and the wellbore pressure;
constructing, by the computer processor, a computational numerical model for simulating interactions between the liner, the cement layer and the formation;
performing, by the computer processor, a plurality of numerical simulations using the computational numerical model to calculate a magnitude and distribution of stress acting on the liner-cement interface and the cement-formation interface, wherein the plurality of numerical simulations are repeatedly performed to obtain model-predicted stresses;
comparing, by the computer processor, the model-predicted stresses on the liner-cement and cement-formation interfaces with values provided by the analytical solution until the model-predicted stresses substantially match the analytical solution; and
performing, by the computer processor, the plurality of numerical simulations using actual in-situ stresses to replace the mean in-situ stress on an outer boundary of the formation layer to calculate the magnitude and distribution of stress acting on the liner-cement and cement-formation interfaces using a calibrated computational mesh where the analytical solution and numerical simulation results match;
applying, by the computer processor, the calculated stresses acting on the liner to a liner integrity evaluation model to determine the integrity of the liner at a plurality of stages of the wellbore;
determining, by the computer processor, a type of second liner based on the liner integrity evaluation model; and
performing a production operation using the wellbore and based on the type of second liner.

2. The method of claim 1, further comprising: obtaining a thickness and mechanical properties of the cement layer; obtaining physical and mechanical properties of the formation from rock mechanics testing; and using the properties of the cement layer and the formation in the computational numerical model.

3. The method of claim 1, further comprising: iteratively improving a computational mesh of the computational numerical model to obtain the calibrated computational mesh before repeating the numerical simulations and comparing the model-predicted stresses on the liner-cement and cement-formation interfaces with the values provided by the analytical solution.

4. The method of claim 1, further comprising: adjusting variables and boundary conditions in the computational numerical model to reflect conditions of the liner, the cement layer, and the formation in the wellbore.

5. The method of claim 1, wherein the computational numerical model is a two-dimensional liner-cement-formation computational mechanics model.

6. The method of claim 1, wherein performing numerical simulation comprises: applying borehole pressure inside the wellbore and mean in-situ stress on an outer boundary of the formation; and running simulations of the interactions between the liner, the cement layer and the formation with the applied borehole pressure and the mean in-situ stress.

7. The method of claim 1, wherein comparing the model-predicted stresses on the liner-cement and cement-formation interfaces with values provided by the analytical solution comprises: comparing the stress on an outer boundary of the liner in the computational numerical model with a corresponding analytical solution.

8. The method of claim 1, wherein the analytical solution represents a three-layer, one-dimensional, axisymmetric model with a borehole pressure and a mean stress acting on different ends of the wellbore.

9. The method of claim 1, further comprising: changing a stress condition on the outer boundary of the formation layer in the computational numerical model to calculate the stress on an outer boundary of the liner, in a case where vertical and horizontal in-situ stresses are unequal.

10. The method of claim 1, wherein the liner integrity is evaluated on an unequal stress field.

11. The method of claim 1, wherein geometric data of the liner comprises an inner diameter of the liner and an outer diameter of the liner, and wherein at least one property of the liner comprises at least one mechanical property of the liner.

12. A system for evaluating an integrity of a liner disposed in a wellbore that contacts a formation through a cement layer between the liner and the formation, the system comprising:
a measurement device configured to measure a property of the liner in the wellbore;
a computer processor comprising functionality for:
computing a stress on an outer boundary of the liner by an iteration procedure that implements an analytical solution of stresses on a liner-cement interface and a cement-formation interface using at least one mechanical property of the liner;
constructing a computational numerical model for simulating interactions between the liner, the cement layer and the formation;
performing a plurality of numerical simulations using the computational numerical model to calculate a magnitude and distribution of stress acting on the liner-cement interface and the cement-formation interface, wherein the numerical simulations are repeatedly performed to obtain model-predicted stresses;
comparing the model-predicted stresses on the liner-cement and cement-formation interfaces with values provided by the analytical solution until the model-predicted stresses substantially match the analytical solution;
performing the plurality of numerical simulations using actual in-situ stress to replace a mean in-situ stress on an outer boundary of the formation layer to calculate the magnitude and distribution of stress acting on the liner-cement and cement-formation interfaces using a calibrated computational mesh where the analytical solution and numerical simulation results match;
applying the calculated stresses acting on the liner to a liner integrity evaluation model to determine the integrity of the liner at a plurality of stages of the wellbore; and
determining, by the computer processor, a type of second liner based on the liner integrity evaluation model; and
performing a production operation using the wellbore and based on the type of second liner, and
wherein geometric data and at least one property of the liner are obtained using at least one of a sonic measurement, a seismic measurement, a density log and a rock mechanics testing.

13. The system of claim 12, wherein the liner comprises an inner diameter and an outer diameter.

14. The system of claim 12, wherein the computational numerical model is a two-dimensional liner-cement-formation computational mechanics model.

15. The system of claim 12, wherein the integrity of the liner is determined by a magnitude and a distribution of a load on the outer boundary of the liner, wherein the magnitude and the distribution of the load is based on a plurality of parameters comprising a thickness of the cement layer, mechanical properties of the cement layer and the formation, in-situ stresses, and a pore pressure in the wellbore.

16. The system of claim 12, wherein the analytical solution represents a three-layer, one-dimensional, axisymmetric model with a borehole pressure and a mean stress acting on different ends of the wellbore.

17. The system of claim 12, wherein the integrity of the liner is evaluated in an unequal stress field.

18. The system of claim 12, wherein the analytical solution and the computational numerical model are integrated by iteratively improving a computational mesh of the computational numerical model to obtain the calibrated computational mesh before repeating the numerical simulations and comparing the model-predicted stresses on the liner-cement and cement-formation interfaces with the values provided by the analytical solution.

19. The system of claim 12, wherein variables and boundary conditions in the computational numerical model are adjusted to reflect changed conditions of the liner, the cement layer, and the formation in the wellbore before repeating the numerical simulations.

* * * * *